UNITED STATES PATENT OFFICE.

LEWIS S. CHICHESTER, OF JERSEY CITY, NEW JERSEY.

MODE OF PREPARING GRAIN, &c., FOR GRINDING.

SPECIFICATION forming part of Letters Patent No. 229,803, dated July 13, 1880.

Application filed September 15, 1879.

*To all whom it may concern:*

Be it known that I, LEWIS S. CHICHESTER, of Jersey City, in the county of Hudson and State of New Jersey, have invented an Improvement in the Preparation of Cereals and the Manufacture of Flour and Meal, of which the following is a specification.

The carbonates, nitrates, and phosphates in grain are not equally distributed, and this is especially the case with wheat, wherein the most valuable substances, or a portion of them, adhere to the bran and are lost as food for man.

The nitrates occupy or constitute a crust around the outside of the grain, being from twelve to fifteen per cent. of the whole grain. The carbonates occupy the center, being from sixty to seventy per cent., and the phosphates occupy the chit or germ, being from one and one-half to three per cent. A small per cent. of the nitrates are mixed with the carbonates and a part of the phosphates with the nitrates. Indeed, the phosphate of lime, which goes to form bone, is almost all mixed with the nitrates in the crust, while the soluble phosphates, which feed the brain, are found in the germ.

To understand how large a part of the phosphates and nitrates is lost in making superfine flour, it will be necessary to explain that gluten, which is the principal nitrogenous element in wheat, is tenacious or adhesive, while starch, the carbonaceous element, is globular and crumbly. The consequence is that in grinding as millers have heretofore done the glutinous crust adhering to the bran, which is the outside woody covering, is separated in flakes and is sifted out, leaving the flour composed almost entirely of starch.

In making superfine flour twenty-five per cent. of the meal goes off in the siftings, of which fifteen per cent. is of the nitrates and phosphates and ten per cent. carbonates. The gluten adheres closely to the bran in a dry state; but if this woody covering is moistened it can be removed easily by proper machinery. The mistake which millers make is in grinding wheat without first removing this woody covering, inasmuch as it is impossible to separate the true bran in a dry state from the adhering gluten, and, of course, moisture cannot be applied to remove it in the ground or broken wheat. Even the expensive regrinding and mixing by what is called the "new process" does not correct the mistake.

My improvement in the manufacture of flour and preparation of cereals for grinding is as follows: The grain is first separated from straw, oats, cockle, and other impurities. Next, the grain passes to any suitable moistening apparatus and then to a huller, where it is stripped of its woody covering, which removes all impurities, leaving each berry clean and pure. The grain in its whole but hulled condition is treated in a desiccator and purifier, which is a suitable vessel furnished with a proper cover, by which the vessel can be made air-tight, and so constructed that heat can be applied to the grain placed within. In this air-tight vessel the grain is subjected to heat sufficient to raise the temperature of the mass and gradually sweat out the water or sap to the surface of each berry, and with it all must or impurity is carried away. This water is about fifteen per cent. of the weight of the grain, or about twenty-five or thirty gallons in one ton. When this process has been continued long enough a vacuum is then produced in the containing-vessel by means of an air-pump, and all moisture is converted into vapor and drawn off through the pump, leaving the mass and each kernel of the mass thoroughly purified and desiccated, and when cold ready for grinding in any suitable mill.

Sometimes the grain is polished in a revolving polisher after it has been dried, so as to rub off any particles of skin or hull that may adhere to it.

Flour thus produced contains all the nutritive properties of the wheat, and twenty per cent. more of valuable flour can be obtained from a given quantity of wheat than can be made in the ordinary process of milling.

Bread made from this flour will be a little darker in color, but will be sweet and delicious.

By this treatment in an air-tight vessel all impurities will sweat out from each grain without breaking up the nicely-balanced chemical combinations or elements of the grain, and when the vacuum is produced in the vessel the mass will be desiccated without danger of accident or injury, as the temperature employed is far below boiling-point. Flour made from the wheat so treated will keep sweet and pure in any climate.

In the manufacture of oatmeal the whole oats are subjected to this process to purify and desiccate the same ready for grinding, to remove the husks from the kernels with more facility, and prevent the breaking up and wasting the kernels. After the kernels are so separated, if desired, they may be subjected again to the purifying and desiccating process.

This process is particularly adapted to maize, and the meal itself may be still further purified and desiccated by being subjected to the heating and vacuum steps of the process, so as to keep in hot climates and be a better food in warm weather.

Fresh ripened corn by this process can be put into the market at once, thus saving six months' interest and expense; besides the meal will be richer, &c.

I am aware that wheat has been hulled and sold as an article of food, and that in some instances such hulled wheat has been ground into flour.

I am also aware that the grain has been moistened before hulling, and also that it has been dried.

I am also aware that fruit has been dried in a partial vacuum.

In my process the heating of the moist grain to sweat the same before drying in a vacuum is necessary to keep the surface of the grain moist until the grain is thoroughly heated, so that impurities and moisture may pass off together.

I claim as my invention—

The process herein specified of preparing wheat and other cereals, consisting in hulling the grain in a moist condition, heating the grain to a temperature sufficient to expel the moisture, applying a vacuum to thoroughly dry the grain, and then grinding or cracking such grain, substantially as set forth.

Signed by me this 27th day of August, 1879.

LEWIS S. CHICHESTER.

Witnesses:
 HAROLD SERRELL,
 WILLIAM G. MOTT.